(12) United States Patent
Yahyanejad

(10) Patent No.: US 10,448,116 B1
(45) Date of Patent: Oct. 15, 2019

(54) METHODS AND SYSTEMS FOR DIGITAL DATA TRANSMISSION THROUGH SATELLITE TV CHANNELS

(71) Applicant: Mehdi Yahyanejad, Venice, CA (US)

(72) Inventor: Mehdi Yahyanejad, Venice, CA (US)

(73) Assignee: NetFreedom Pioneers, Marina Del Rey, CA (US)

( * ) Notice: Subject to any disclaimer, the term of this patent is extended or adjusted under 35 U.S.C. 154(b) by 0 days.

(21) Appl. No.: 15/932,605

(22) Filed: Mar. 23, 2018

Related U.S. Application Data

(60) Provisional application No. 62/601,504, filed on Mar. 25, 2017.

(51) Int. Cl.
| | |
|---|---|
| *H04H 40/00* | (2009.01) |
| *H04N 21/61* | (2011.01) |
| *H04N 21/235* | (2011.01) |
| *H04N 21/2383* | (2011.01) |
| *H04N 21/234* | (2011.01) |
| *H04N 7/20* | (2006.01) |
| *H04N 21/434* | (2011.01) |

(52) U.S. Cl.
CPC ........... *H04N 21/6143* (2013.01); *H04N 7/20* (2013.01); *H04N 21/234* (2013.01); *H04N 21/235* (2013.01); *H04N 21/2383* (2013.01); *H04N 21/4345* (2013.01)

(58) Field of Classification Search
CPC . H04L 65/607; H04L 29/06027; H04L 67/06; H04L 65/602; H04L 65/4076; H04W 28/06; G06F 17/30194; H03M 13/29; H03M 13/2906
USPC ........................................................ 455/3.06
See application file for complete search history.

(56) References Cited

U.S. PATENT DOCUMENTS

| | | | |
|---|---|---|---|
| 2009/0028079 A1* | 1/2009 | Song | H04L 1/0041 370/310 |
| 2013/0060956 A1* | 3/2013 | Nagaraj | H04N 21/4384 709/231 |

* cited by examiner

*Primary Examiner* — Tu X Nguyen

(57) ABSTRACT

A system for data transmission comprises an encoder for encoding a data file into a TS stream, and a broadcaster for broadcasting the TS stream, wherein a receiver receives the TS stream, and a decoder decodes the received TS stream and extracts the data file. A system for receiving data comprises a receiver for receiving a broadcast TS stream, wherein a data file is encoded and embedded into the TS stream, a storage device for storing the TS stream, and a decoder for decoding the TS stream and extracting the data file.

20 Claims, 12 Drawing Sheets

|  | Bytes | Name | Description |
|---|---|---|---|
| 402 | 0.5 (4bit) | version | - |
| 404 | 0.5 (4bit) | payload type | 0Normal, 1Info, 2Cluster |
| 406 | 2 | continuity_counter_ex | extended continuity number |
| 408 | 181 | payload | payload in binary |

Figure 4

| Bytes | Name | Description |
|---|---|---|
| 502 4 | clusterNumber | Cluster Number |
| 504 177 | LiCluster payload | payload in binary |

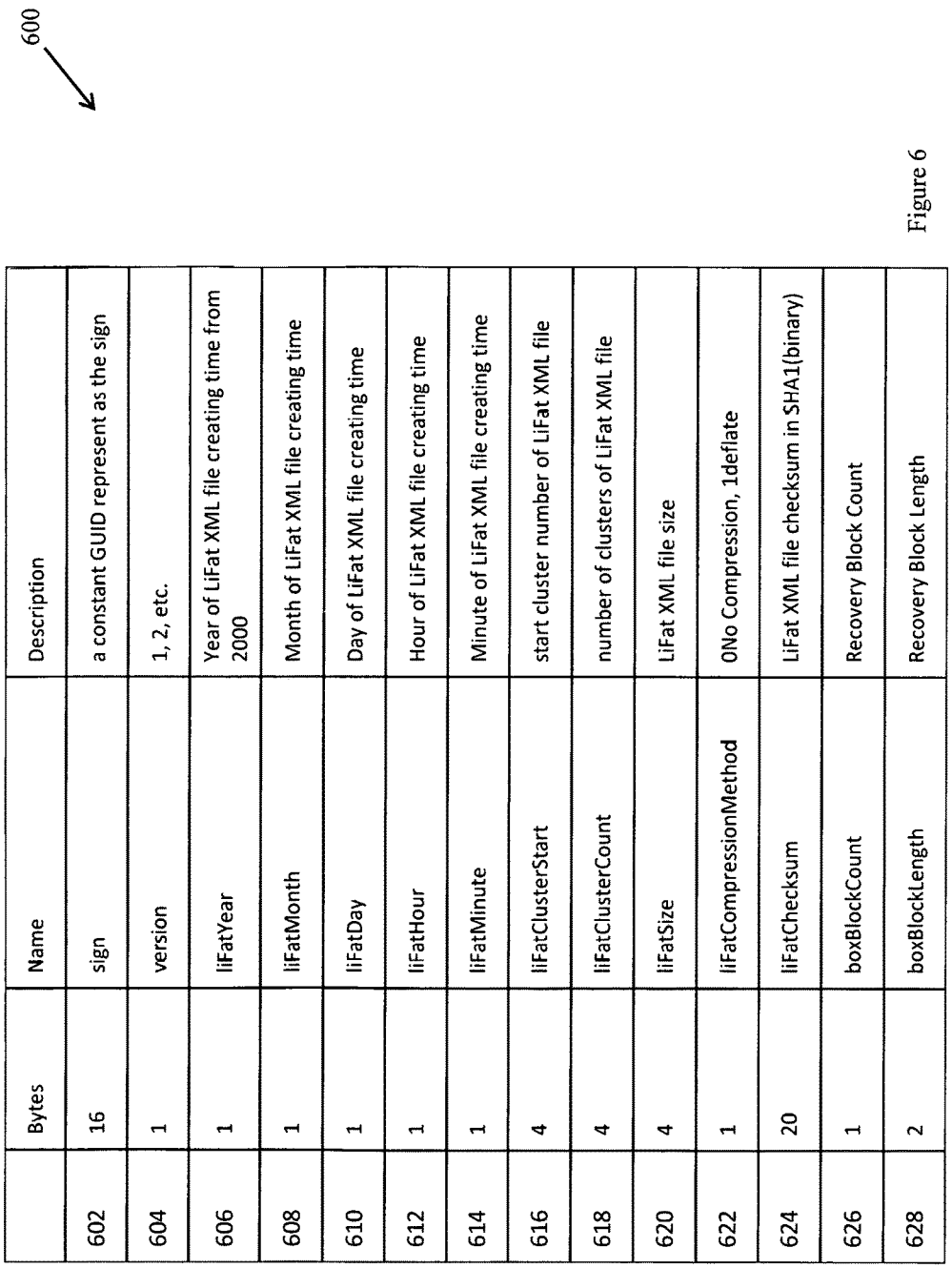

Figure 6

| Bytes | Name | Description |
|---|---|---|
| 602 | 16 | sign | a constant GUID represent as the sign |
| 604 | 1 | version | 1, 2, etc. |
| 606 | 1 | liFatYear | Year of LiFat XML file creating time from 2000 |
| 608 | 1 | liFatMonth | Month of LiFat XML file creating time |
| 610 | 1 | liFatDay | Day of LiFat XML file creating time |
| 612 | 1 | liFatHour | Hour of LiFat XML file creating time |
| 614 | 1 | liFatMinute | Minute of LiFat XML file creating time |
| 616 | 4 | liFatClusterStart | start cluster number of LiFat XML file |
| 618 | 4 | liFatClusterCount | number of clusters of LiFat XML file |
| 620 | 4 | liFatSize | LiFat XML file size |
| 622 | 1 | liFatCompressionMethod | 0No Compression, 1deflate |
| 624 | 20 | liFatChecksum | LiFat XML file checksum in SHA1(binary) |
| 626 | 1 | boxBlockCount | Recovery Block Count |
| 628 | 2 | boxBlockLength | Recovery Block Length |

METHODS AND SYSTEMS FOR DIGITAL DATA TRANSMISSION THROUGH SATELLITE TV CHANNELS

RELATED APPLICATION

This non-provisional application claims the benefit of priority in U.S. provisional application No. 62/601,504 filed Mar. 25, 2017, and entitled "Methods and systems for Digital Data Transmission through Satellite TV Channels" the entire content of which is incorporated herein by reference.

BACKGROUND

One of the existing technological challenges is delivering information such as digital files to places with no Internet access or with limited Internet connection. To address this problem, some technologies use data broadcast channels to send digital data. These data broadcasts, however, require special DVB computer cards for receiving the content.

The existing methods may also require data channels that are not as prevalent on the commercial satellites as the TV channels. If the data channels are on a different satellite from the one people are watching TV on, the user has to purchase a separate satellite dish. Users of these methods may need to be tech savvy to be able to use DVB cards which often require installing new software and drivers to receive data channels from services such as SatTorrent.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIG. 4 shows the binary structure of a LiPacket according to some embodiments.

FIG. 5 shows the binary structure of a LiPacket payload for TS packet-2 according to some embodiments FIG. 6 shows the detailed structure of a LiInfo packet for TS packet-1 according to some embodiments.

DETAILED DESCRIPTION

Figure 1:
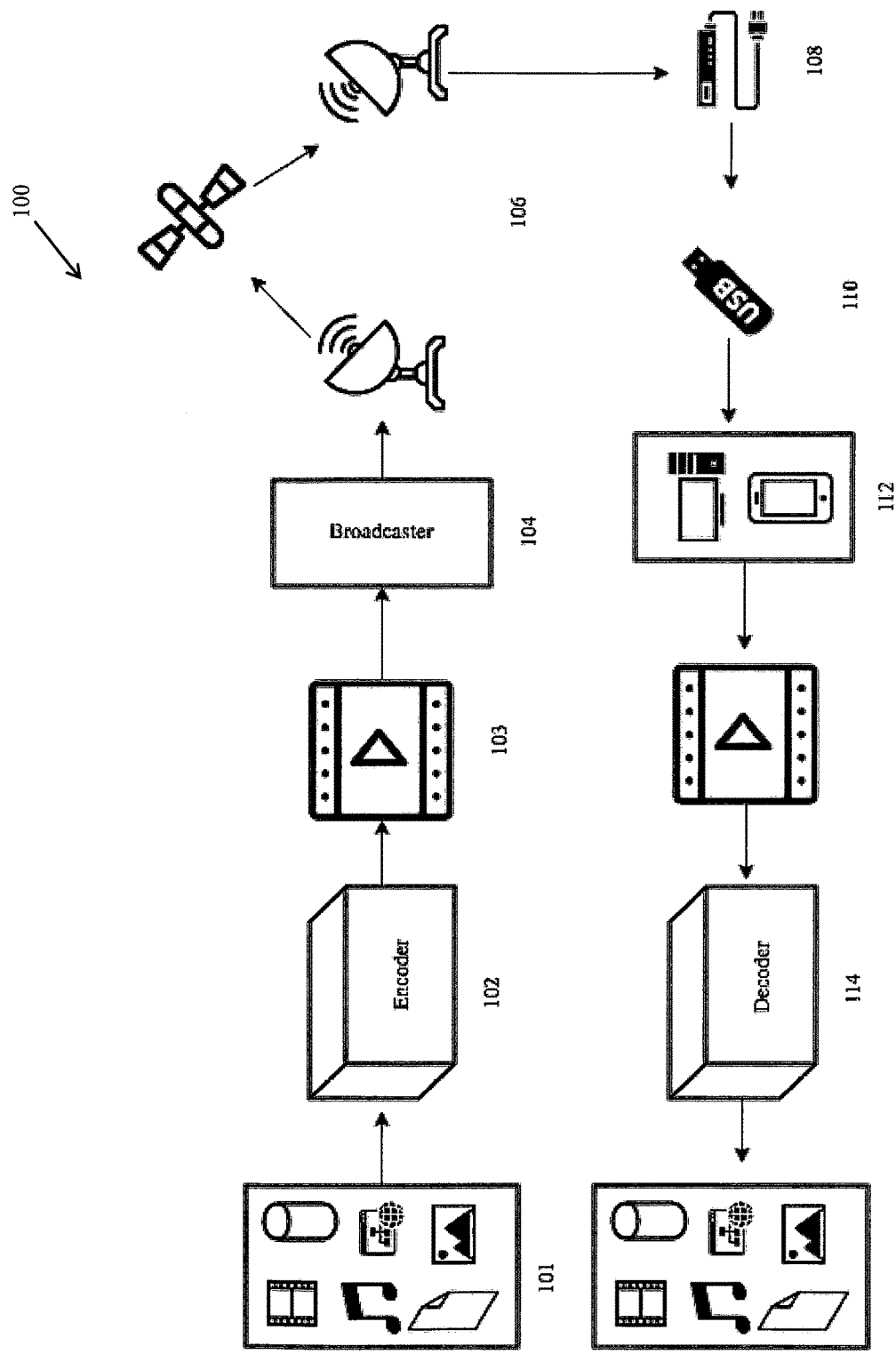
FIG. 1 depicts a data transmission system according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments relate to delivering data using digital broadcasting systems. Some embodiments relate to digital broadcasting systems and some corresponding data processing methods.

Some embodiments use the satellite TV channels to stream digital files and receive the content through the TV satellite receivers. With these technologies, users don't need new hardware beside what is used for receiving satellite signals or TV signals.

Some embodiments embed the data files in an MPEG-TS stream. Such embedding allows using the conventional satellite set-top boxes to receive the data files and also using the conventional TV satellite broadcasters to send data files. In various embodiments, data files can include video or audio files, binary files, or any digital format such as .mp4, mp3, .zip, .exe, etc.

In some embodiments, the user can choose between several streams of different types of content over one channel without the need of a two-way connection. In other words, the users' set-top box will allow them to switch between different video and audio streams on a specific channel. To switch to another stream, not like the internet, users do not send a request to obtain their desired content, but they have the option to choose between a number of streams.

In some embodiments, data files are converted to MPEG-TS stream on one or more servers and are transmitted to a satellite TV broadcast service. The user receives the data files using satellite TV receivers and records them to a storage device such as a USB flash drive. Later, the recording can be decoded using specific software that runs on a computer, a tablet, a mobile phone, or a smart TV.

In some embodiments, a modified satellite receiver records and decodes received data directly. Also, a Wi-Fi enabled device may allow the user to access the received data through a wireless network.

In some embodiments, users can share received files within a geological network zone using a modified encrypted network. In this method, users obtain a peer-to-peer file sharing application that uses torrent protocols to share content.

The user can then use the decoded data files by, for example, reading the text files, listening to the audio files, or watching the video files included in the data files.

Some embodiments do not require a data satellite channel and can be used on regular satellite TV channels. Therefore, these technologies may differ from systems that require a DVB card or proprietary hardware that can receive data streams.

FIG. 1 depicts a data transmission system 100 according to some embodiments. System 100 includes an encoder 102, a broadcaster 104, a satellite system 106, a receiver 108, a storage device 110, a computing device 112, and a decoder 114.

The encoder receives data files 101 that need to be transmitted and encodes the data into a TS stream 103. The broadcaster broadcasts TS stream 103 using satellite system 106. The user receives the TS stream via receiver 108 and stores the stream on storage device 110. The user then connects the storage device to computing device 112. The computing device decodes the stored TS stream and extracts data files 101, which then can be used by the user. In some embodiments, the computing device performs the decoding by running a decoder software.

Figure 2:
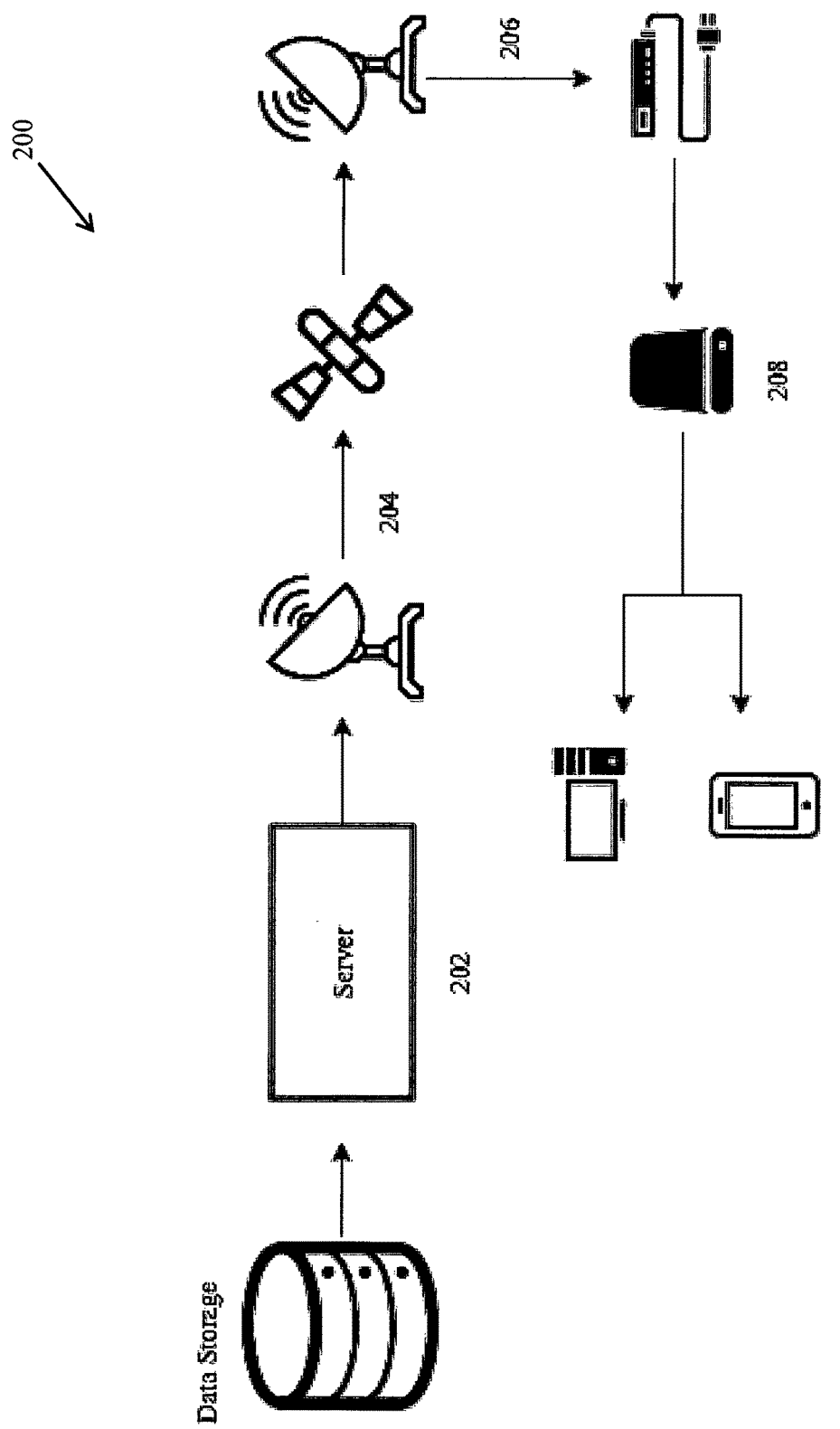
FIG. 2 shows a flow chart for a data transmission method according to some embodiments.

FIG. 2 shows a flow chart 200 for a data transmission method according to some embodiments. In some embodiments, various steps of the data transmission method may be performed by a data transmission system such as system 100 of FIG. 1, or parts of such a system.

In step 202, the system embeds the data files into a specific sub-stream of TS packets. TS packets are created by a standard TS creation codec.

In step 204, the system broadcasts the TS stream.

In step 206, a user receives the TS stream.

In step 208, the user stores the TS stream in a storage device.

In step 210, the user decodes the stored TS stream using a decoder.

Some embodiments use a video broadcasting infrastructure called TV Service as opposed to Data Service to deliver the data files. The data files are broadcasted by embedding them into a DVB TV or DVB Radio broadcasting channels. In some embodiments, a DVB standard defines MPEG Transport Stream (TS stream) as the standard protocol for transmitting streams between producers, distributors, broadcasters, and customer devices. Some embodiments allow encoding data files into TS stream, enabling delivery of the data over satellite TV channels.

Some embodiments use a protocol named Lisa Transfer Protocol (LTP), which is designed for sending digital data files from a server to clients. Files and folders are first uploaded to a server. These files and folders are packetized into TS standard packets using LTP. This stream is called "Lisa Package". Broadcasters receive on a channel the content as a MPEG-TS stream that contains streams such as video streams and audio streams.

With this solution, users may select the channel with a satellite receiver, and record a still picture or low-quality video that appears on the screen to a storage device such as a USB flash drive plugged into the satellite receiver. In some embodiments, the recording may take a few minutes. After the recording finishes, the user can plug the USB flash to a device such as a personal computer and run a decoder software. This software will extract the original data files from the TS packets. The extracted files may be viewable on devices such as but not limited to personal computers, mobile phones, or tablet computers.

The storage device may be another device such as the internal hard disk of the satellite receiver, or other network connected storage devices. In addition, instead of using a satellite TV receiver, a user may use other devices, such as a DVB capture card connected to a PC to directly save the video stream to the PC hard disk.

Client software to extract the files from the TS packet may also be implemented for mobile phones, tablets, smart TVs, and set-top boxes.

In LTP, files and folders are placed on a server. These files and folders are packetized into a package containing TS standard packets. This package is called a Lisa Package. Building a. Lisa Package from files and folders on a server may be similar to copying them into a virtual file system. The virtual file system that LISA uses is called LisaFS, which includes a LiPacket and a LiFat, as explained below.

Each Lisa Package contains a stream of TS packets. In some embodiments, a TS packet length is 188 bytes, of which 4 bytes is its header. So, the maximum TS Packet payload is 184 bytes.

In LTP, each TS packet carries a Lisa specific part called a LiPacket. LiPackets have payloads of LiCluster or LiInfo. LiClusters contain the data. This includes LiFat file, and data files and folders. LiFat contains the properties of data files and folders, and their hierarchy. LiFat may be stored, for example, in an XML file. These properties contain some metadata information such as file name, extension, checksum, size and its cluster ID information. LiInfo, on the other hand, contains metadata of LiFat including package creation time, size, cluster information, and compression method.

LiFat helps the decoder to find the information of files such as locations of LiCluster in the LisaFS. In some embodiments, LisaFS is a file system with a sector size of 188 bytes. It is used to control how data is stored and retrieved.

The LiFat file is placed in the Lisa Package and is used for extracting files and folders from the Lisa Package. LiFat is used to extract Lisa Packages. LiFat is added to each Lisa package several times. This repetition is based on many factors such as bandwidth, stability, number of files and the size of LiFat.

The decoder may also perform packet recovery. During transmitting TS packets from LISA stream server to satellite network broadcaster server some packets may be lost. In addition, some packets may be lost during the transmission from the satellite broadcaster to the receiver due to factors such as bad weather, noise, or jamming signal. LISA Transfer Protocol has a packet recovery mechanism with a dynamic configuration to allow recovering the lost packets.

For data recovery, received data in a LisaFS is divided into several chunks called Boxes. Each Box contains a few blocks. Each Block contains many LiPackets, which contains bytes. The final block of each Box is the parity Block. Each LiPacket has a unique incremental ID, which identifies its exact position in the stream. This allows identifying the lost packet in the stream. Once the lost LiPacket is identified, it can be recovered by performing XOR operation using the parity block.

In various embodiments, a multiplexer performs encoding and a modifier is responsible for embedding of the content in the MPEG-TS stream. These operations may be implemented in various ways, some of which are described below and include data piping using null packets, data piping using a stream template, data streaming using custom MPEG stream, and data streaming using MPEG private section. Various embodiments stream the content data as the audio stream, the video stream, the subtitle stream, or teletext.

In some embodiments, Lisa TS packets are of two types, as further described below. TS packet type 1 (TS packet-1) has a payload of LiInfo, carrying metadata. TS packet type 2 (TS Packet-2), on the other hand, has a payload of LiCluster, carrying data files.

In some embodiments, each LiPacket contains 2 bytes integer ID (16 bits) and by conjunction of TS continuity counter, it extends to 20 bits. This ID is unique in entire LISA package and is incremented sequentially.

Figure 3:
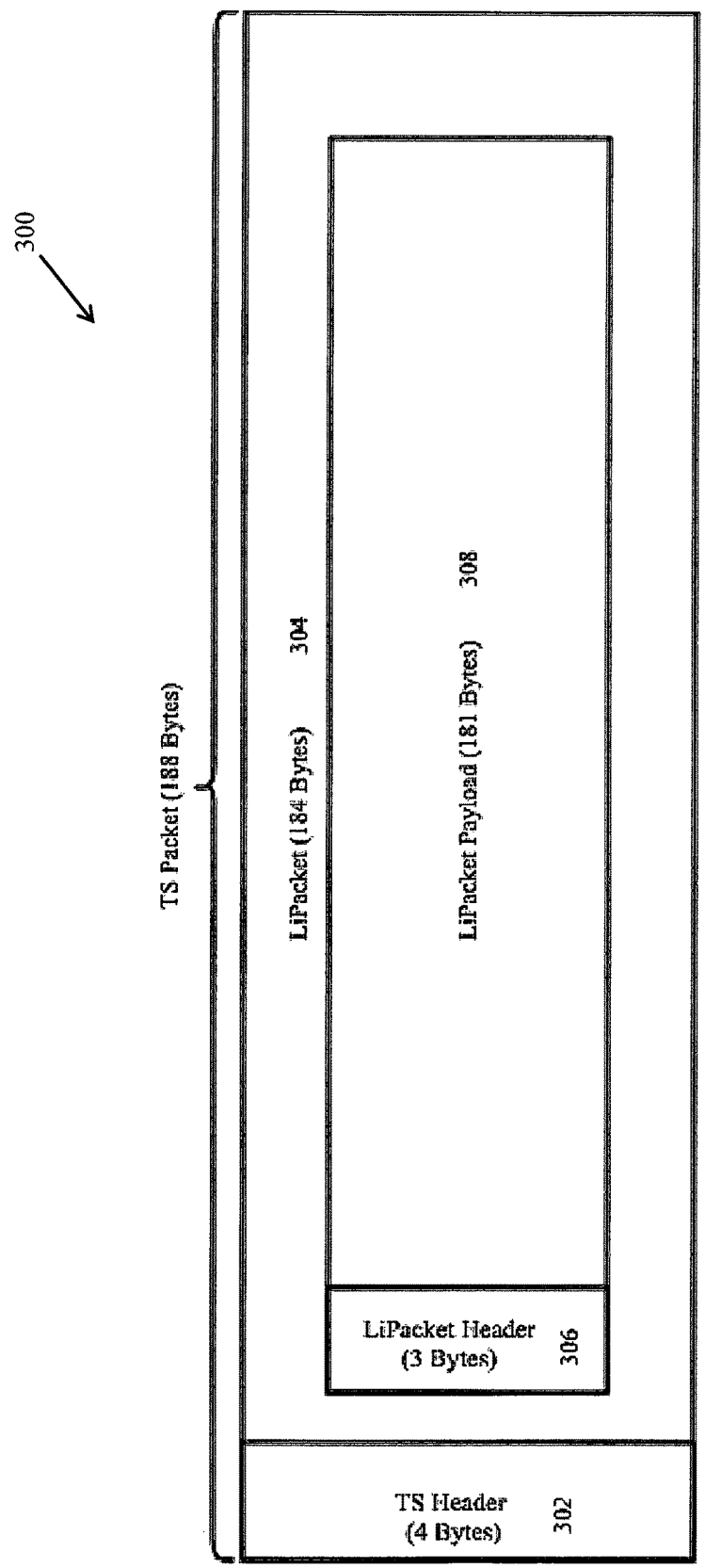
FIG. 3 shows a Lisa TS packet according to some embodiments.

FIG. 3 shows a Lisa TS packet 300 according to some embodiments. TS packet 300 includes a TS header 302 that is defined in MPEG design, and a TS payload, which for a Lisa TS packet is LiPacket 304. In some embodiments, TS header 302 is 4 bytes and LiPacket 304 is 184 bytes.

LiPacket 304 includes a LiPacket header 306 and a LiPacket payload 308. LiPacket header 306 is 3 bytes and LiPacket payload 308 is 181 bytes.

FIG. 4 includes table 400 showing in more detail the binary structure of LiPacket 304 according to some embodiments. LiPacket header 306 includes version or ID 402, payload type 404, continuity counter_ex 406, and LiPacket payload 408. Version 402 is 0.5 bytes. The value of version 402 may be 1, 2, etc. Payload type 404 is 0.5 bytes and in some embodiments its value is 0 for conventional payload, 1 for LiInfo, and 2 for LiCluster. Continuity_counter_ex 406 is 2 bytes and indicates the LiPacket extended continuity number.

In some embodiments, LiPacket payload is either a LiCluster (for TS packet-2) or a LiInfo (for TS packet-1). These two types are distinguished by payloadType 404 of the LiPacket.

FIG. 5 includes table 500 showing in more detail the binary structure of LiPacket payload 308 for TS packet-2 according to some embodiments. The LiPacket payload includes LiCluster header 502 and LiCluster payload 504. LiCluster header 502 is 4 bytes. It contains clusterNumber indicating the number of the cluster, which may be 1, 2, etc. LiCluster payload 504 is 177 bytes and contains the transmitted data.

In some embodiments, LiCluster header 502 includes a 4 byte integer ID that is unique in each Lisa package and is called cluster number. Because the cluster number is 4 bytes, the maximum number of clusters per Lisa package can be 2^32. Therefore, in some embodiments, the maximum size of content in a Lisa package can be 760,209,211,392 bytes that is calculated by multiplying 2^32 and 177 bytes.

Each non-zero size file requires at least one cluster, but a zero size file does not require any cluster.

File contents are placed into LiCluster's payload and each file is placed into a Lisa package sequentially, so each file has a unique range of cluster number whose start and end are distinctive.

LiInfo is the payload of a LiPacket whose type is set to 1 and is added before LiFat. LiInfo contains metadata of LiFat including package creation time, size, cluster information, and compression method.

FIG. 6 includes a table 600 showing a detailed structure of a LiInfo packet for TS packet-1, according to some embodiments. The LiInfo packet include a 16 byte sign 602, which is a constant globally unique ID; a 1 byte version 604, which can be 1, 2, etc.; LiFatYear 606, LiFatMonth 608, LiFatDay 610, LiFatHour 612, and LiFatMinute 614, each of which is 1 byte and which respectively indicate the year (measured from 2000), the month, the day, the hour, and the minute of the time at which the LiFat XML file was created; a 4 byte LiFatClusterStart 616, which indicates the starting cluster number of LiFat XML file; a 4 byte LiFatClusterCount 618, which indicates the number of clusters of LiFat XML file; a 4 byte LiFatSize 620, which shows the LiFat XML file size; a 1 byte LiFatCompressionMethod 622, which indicates whether or not any compression is used, and may be 0 for no compression and 1 for deflate compression; a 20 byte LiFatChecksum 624, which contains binary of LiFat XML file checksum in SHA1; a 1 byte boxBlockCount 626, which indicates the recovery block count; and a 2 byte boxBlockLength 628, which indicates the recovery block length.

Some embodiments also use a robust error correction scheme to correct errors that may be caused through one-way broadcasts. In some embodiments, the protocol used to transmit TS packets from server to Satellite Network Broadcaster server is UDP over IP. Due to the nature of UDP, some packets might get lost. In addition, some packets may be lost due to inclement weather, noises, or jamming. In some embodiments, for every few number of packets (e.g., every five packets), an error correction packet is added.

Figure 7:
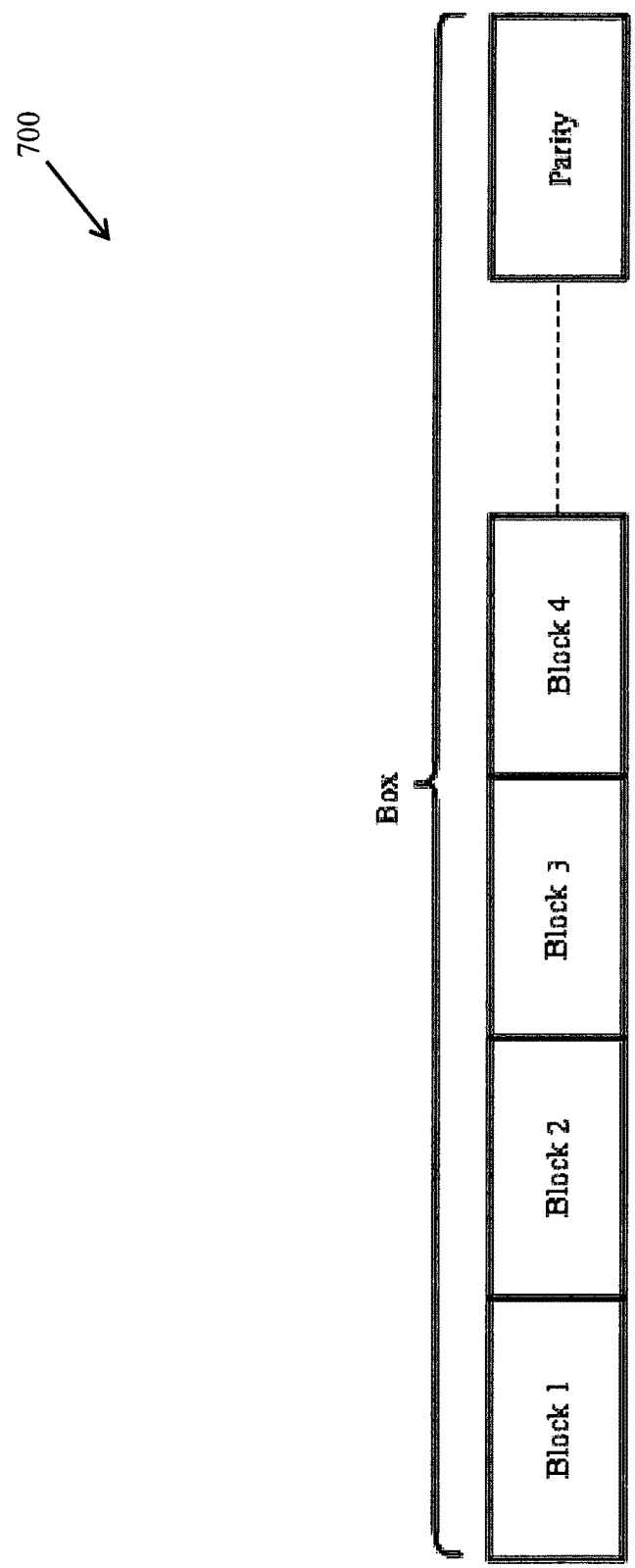
FIG. 7 shows a LiPackage according to some embodiments.

FIG. 7 shows a LiPackage 700 according to some embodiments. LiPackage 700 includes one or more payload blocks and a parity block. Each payload block includes one or more TS packet-2s and TS packet-1s. A parity block includes one or more TS packet-2s. All the blocks have the same number of TS packets. The number of blocks and the number of TS packets per block are defined based on different factors, for example, noise reduction or packets recovery.

For example, in one embodiment, the total number of payload blocks in a box maybe set to 4. Moreover, the size of each payload block and thus the total number of TS packets in a payload block maybe set to 2048 TS packets.

The number of TS packet-1 in each payload block is determined based on the total number of the files to be transmitted in the package and the total size of the data in the package. The remainder of the TS packets in each payload block (e.g., in the above example, the remainder of the 2048 TS packets in the payload block) are dedicated to TS packet-2 for transmitting the data. If these TS packet-2s in the first payload block cannot fit all data, a second payload block is created of the same size as the first payload block. The second payload block contains IS packet-1s identical to the TS packet-1s in the first payload block. Further, the remainder of the TS packets in the second payload block are TS packet-2s that hold the remainder of the data. If the TS packet-2s in the second payload block cannot fit the remainder of the data, a third payload block is created and this process is repeated.

Once all the data are fit into the payload blocks, the payload blocks are divided into groups of 4 (per the above example) and a parity block is created for each group. These 5 blocks are packaged and transmitted as a box. The parity block in each box contains XOR of the 4 payload blocks in that box. The parity block maybe used for error checking or recovering lost TS packets in the box.

In various embodiments, LTP encodes the data by packetizing the data files and folders into Lisa TS packets using various methods as described below.

Packetizing is the process of breaking a file into smaller data pieces. In some embodiments, files are divided into 177 bytes pieces to be placed in the LiCluster payload of TS packets.

Figure 8:
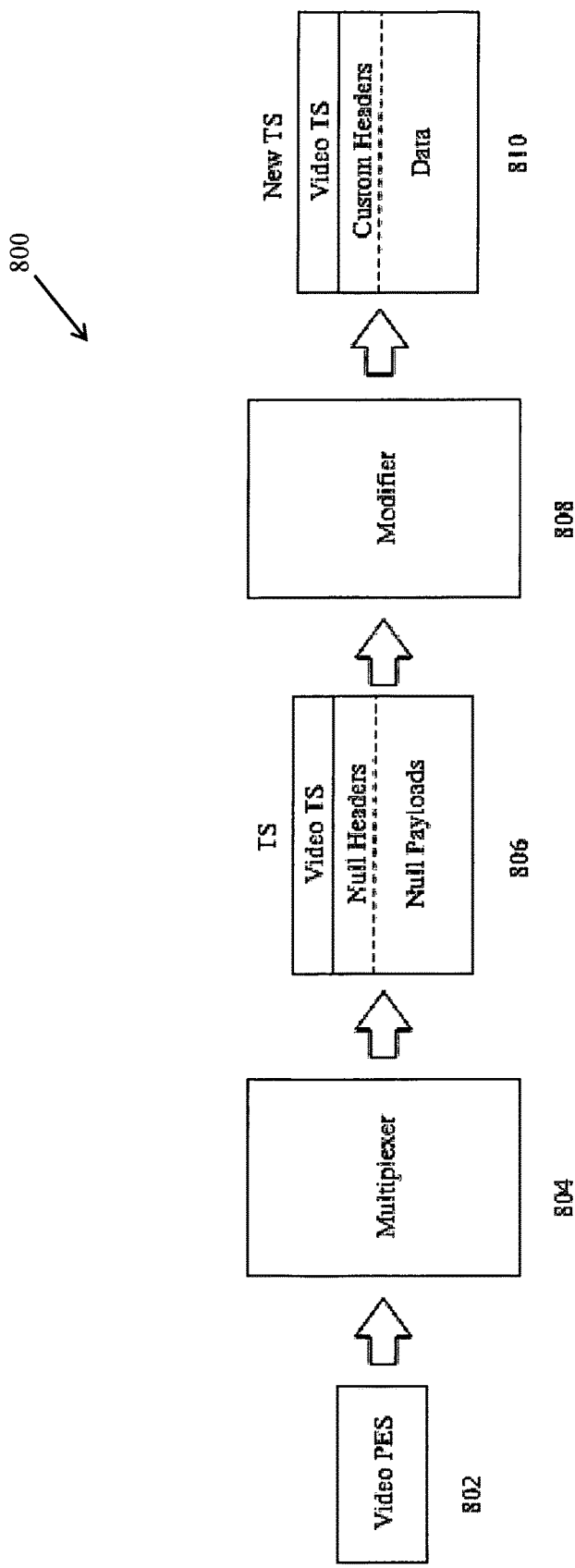
FIG. 8 shows an LTP system that performs a method of data piping using Null packets according to some embodiments.

FIG. 8 shows an LTP system 800 that performs a method of data piping using Null packets according to some embodiments. System 800 includes a video Packetized Elementary Stream (PES) 802, a multiplexer 804, a TS packet 806, a modifier 808, and a new LISA TS packet 810. The new Lisa TS packet structure is shown in FIG. 3. The video PES is fed to a multiplexer that generates a constant bitrate. In various embodiments, the constant bitrate may depend on the broadcasting bandwidth and may for example be 512 Kbps, 1024 Kbps, 3072 Kbps, etc. The multiplexer creates a TS packet that includes a video TS, a Null header, and Null payloads. The TS packet is fed into a modifier, which creates a new TS packet by replacing the Null header with a custom header similar to a TS header, and further replacing the Null payload with the data to be transmitted. The new TS packet is then broadcasted through a satellite TV channel.

Figure 9:
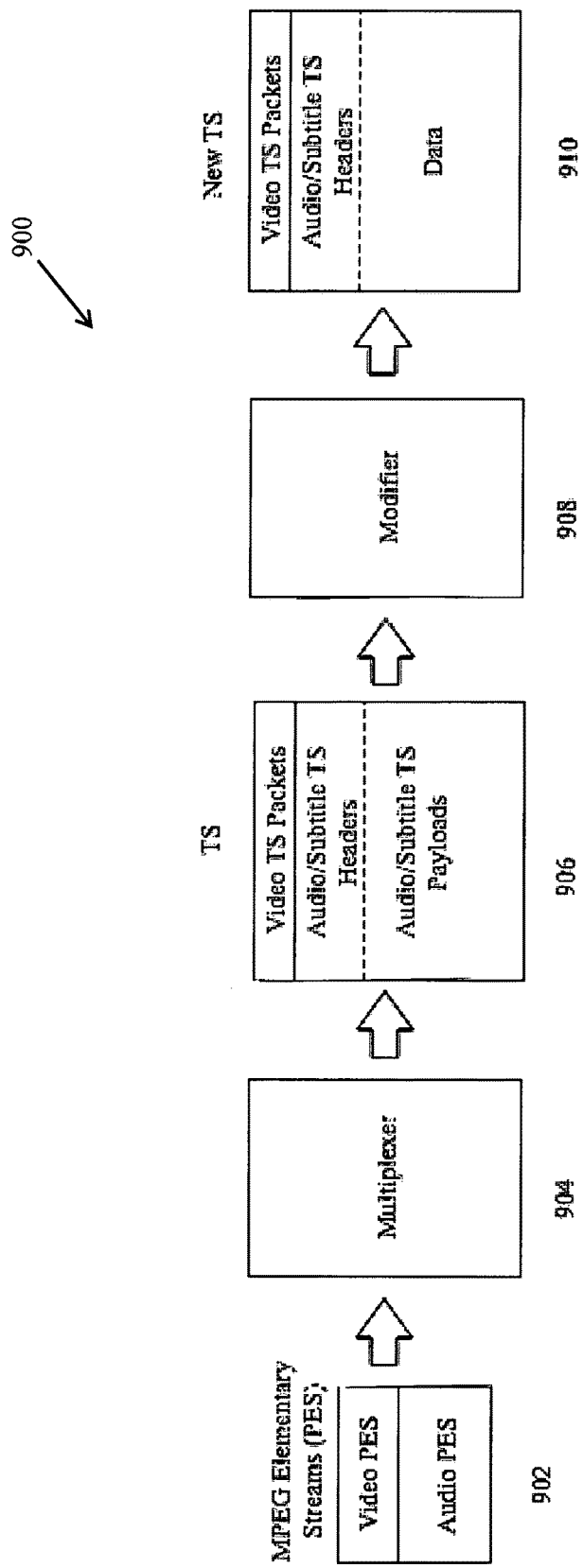
FIG. 9 shows an LTP system that performs a method of Data Piping using a Stream Template according to some embodiments.

FIG. 9 shows an LTP system 900 that performs a method of Data Piping using a Stream Template according to some embodiments. System 900 includes an MPEG Packetized Elementary stream (PES) 902, a multiplexer 904, a TS packet 906, a modifier 908, and a new Lisa TS packet 910, as shown in FIG. 3. The MPEG elementary streams with a fix bitrate stream of video, audio, and subtitle and/or EPG is fed to the multiplexer to create a TS packet 906 that includes video stream, audio stream(s), subtitle(s), and/or EPG. Then the headers of TS packets of the desired sub-stream will be kept and matched with the data payloads in the modifier. In some embodiments the modifier replaces the Audio TS Payloads with the data to be transmitted (Lipacket payload 308) and creates a new Lisa TS packet 910. The structure of the new Lisa TS packet 910 is shown in FIG. 3. In some embodiments the modifier replaces the subtitle TS payload with the data to be transmitted (Lipacket payload 308) and creates the new Lisa TS packet 910.

Figure 10:
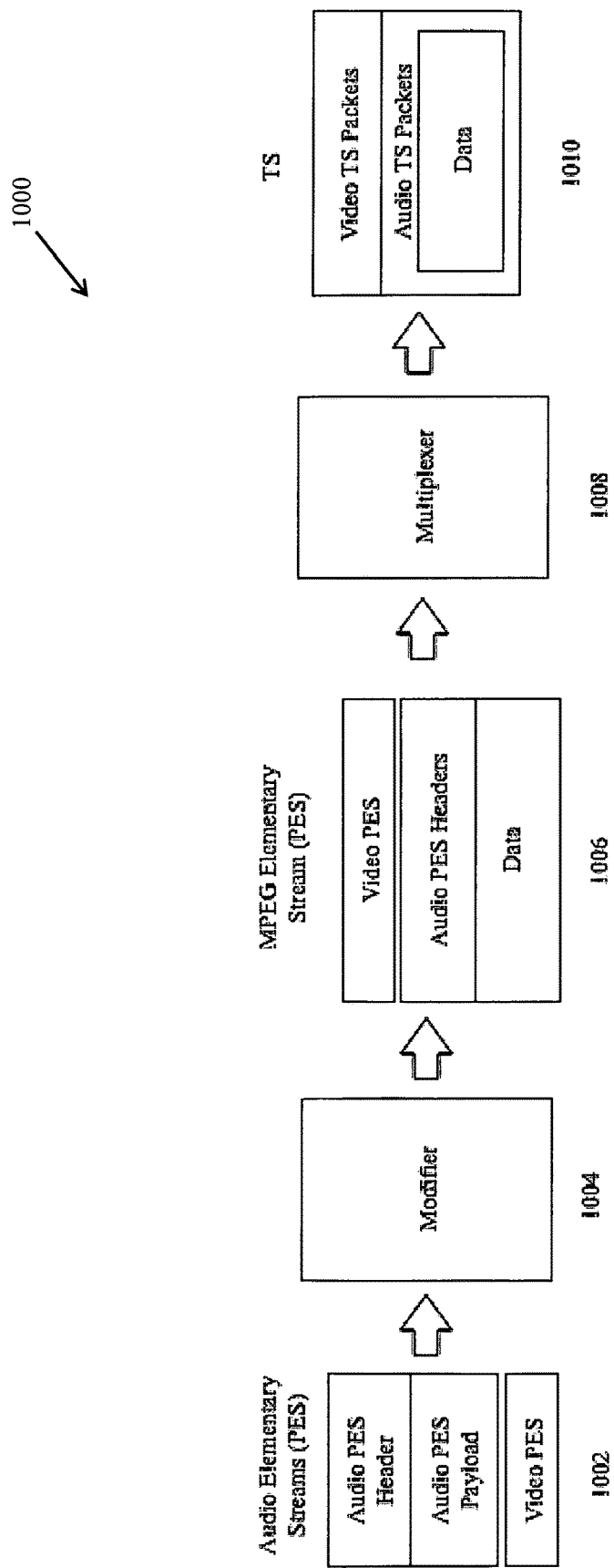
FIG. 10 shows an LTP system that performs a method of Data Streaming using custom MPEG stream.

FIG. 10 shows an LTP system 1000 that performs a method of Data Streaming using custom MPEG stream. System 1000 includes an audio elementary stream 1002, a modifier 1004, an MPEG elementary stream 1006, a multiplexer 1008, and a TS packet 1010. Audio elementary stream 1002 gets fed into modifier 1004 along with a video PES to make MPEG elementary stream 1006. In some embodiments, the modifier replaces audio PES payload with the data and creates a TS packet. This method is useful for the embodiments that only support MPEG files. In some older versions of satellite receivers, clients do not support TS format recording and by using this method, users can record the data through recording with MPEG format directly.

Figure 11:
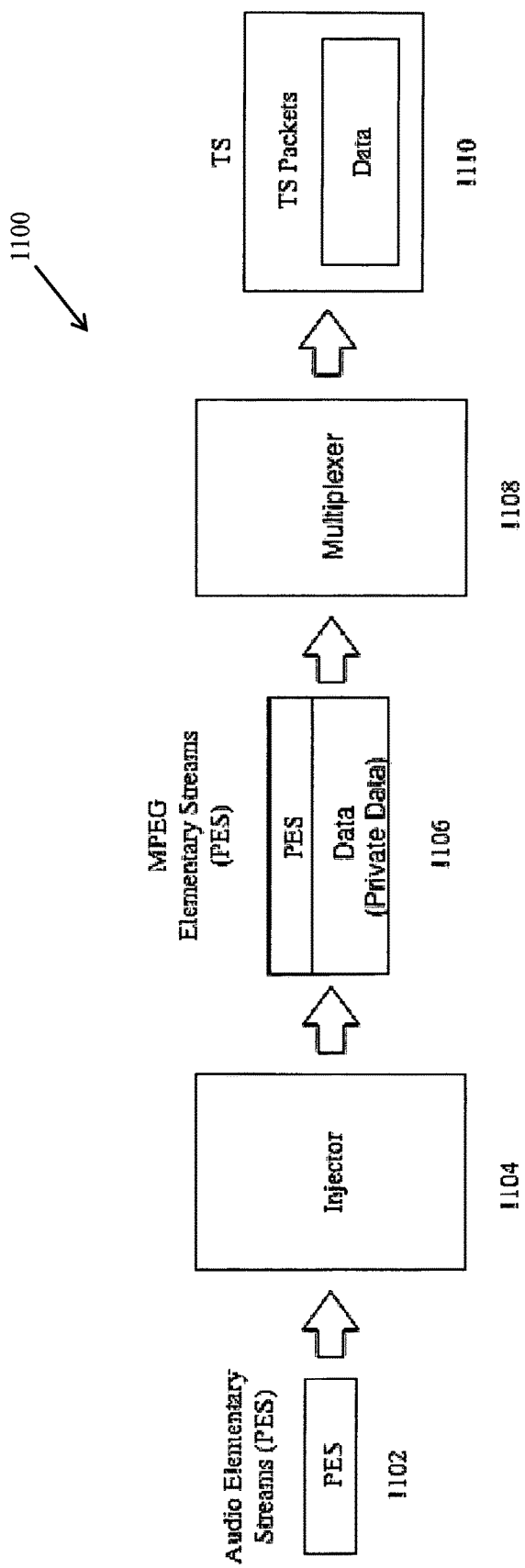
FIG. 11 shows an LTP system that performs a method of Data Streaming using MPEG private section according to some embodiments.

FIG. 11 shows an LTP system 1100 that performs a method of Data Streaming using MPEG private section according to some embodiments. System 1100 includes audio elementary streams 1102, injector 1104, MPEG elementary stream 1106, multiplexer 1108, and a TS packet 1110. The audio elementary stream is fed to injector with the data to make an MPEG Elementary stream. In this method data will be stored in the private section of every PES packet. This MPEG elementary streams is fed to multiplexer to make a TS packet.

In some embodiments, LISA creator runs on server side and creates a TS packet and embed all files and folders from a specific folder.

In some embodiments, the embedder application replaces the created Lisa TS packets with a specific sub-stream of a conventional TS packet that is created by a standard TS creation codec. Embedder sequentially reads the created TS packets and replaces the payload of each packet of the sub-stream and Null packets. These packets should have a specific packet identifiers (PID) that comes with the generated sub-stream payload. A PID is specified to each stream by the broadcaster and is unique throughout all the transponder streams.

In some embodiments, end user should record broadcasted media as in TS format. In order to have all of the broadcasted data, the length of the recorded media should be at least the same as the broadcasted media, but the start time of recording is not important.

In some alternative embodiments, a hardware may embed the decoding software or plugin to decode the TS stream. A hardware such as a receiver can run a custom application that decodes the TS stream to the data files (as further explained below) and records the content on the device.

Some embodiments utilize standard MPEG audio and video broadcasting mechanisms that are independent of the broadcasters for sending the digital data. At the receiving end, the stream can be received by a conventional home DVB satellite receiver and be decoded, that is, converted from TS stream to data files.

Various embodiments send digital files over conventional digital satellite TV channels. This may be achieved by encoding data files into TS stream and broadcasting them over a conventional TV channel. A satellite receiver may receive the TS stream. The user may use a satellite receiver that supports recording program channels to a storage device such as a USB memory stick or a USB portable hard disk.

The user can thus record the received TS stream on a storage device. The user can then decode the recorded stream to the digital files using a custom-made software-based decoder. The decoding can be performed by a computing device such as a PC, a mobile phone, a notebook, a custom-made receiver, a smart TV, or any device with the custom decoder application. In some embodiments, the user does not need any other hardware for decoding the data files.

In some embodiments, the user inputs a folder containing recorded TS files into the decoder software.

Figure 12:
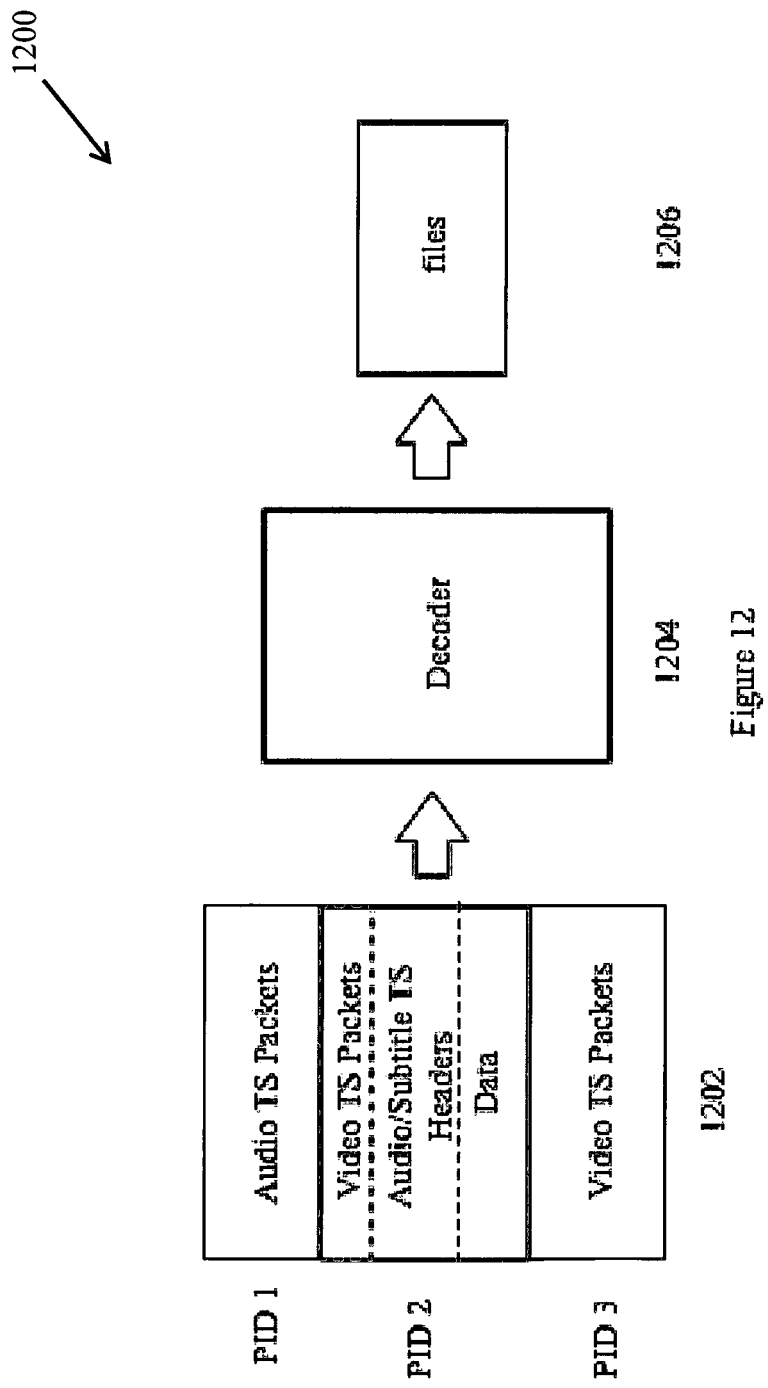
FIG. 12 shows an LTP decoder system that performs extraction of the data from the recorded TS stream according to some embodiments.

FIG. 12 shows an LTP decoder system 1200 that performs extraction of the data from the recorded TS stream according to some embodiments. Decoder system 1200 includes TS packet streams 1202, decoder 1204, and data files 1206.

In the exemplary embodiment of system 1200, TS packet streams 1202 contain three groups of TS packets with three different PIDs. The first and third groups include TS packets that carry conventional audio and video data respectively. The second group includes Lisa TS packets that carry data.

TS packet streams 1202 are fed into decoder 1204. Decoder 1204 looks for LiInfo packets to determine the PID of Lisa TS packets. If LiInfo is found, e.g., in the second group, decoder 1204 determines that the group with this PID is for a Lisa TS stream. Decoder 1204 restarts reading from the beginning of the group and reading the LiPackets. After reading LiInfo, the subsequent TS packets contain LiFat. The decoder then reads LiFat packets, each containing a chart of the files and their location in the stream. Then decoder 1204 creates an empty LiFat in memory and sequentially reads all TS packets and processes the payloads of that specific PID. The LiClusters extracted from payloads get processed for file chunks to recreate the transmitted files using the LiFat in memory.

Decoder 1204 creates a FileInfo for each processing file and creates ClusterMap for any uncompleted file. The ClusterMap is a bit array and stores which clusters are extracted properly.

Decoder 1204 completes the extraction to generate data file 1206.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method for data transmission, the method comprising:
dividing a data file into a plurality of data pieces;
placing the plurality of data pieces in a plurality of TS packets to create a TS stream; and
broadcasting the plurality of TS packets via a satellite system,
wherein:
the plurality of TS packets comprise a plurality of TS packets type 1 and a plurality of TS packets type 2;
each of the plurality of TS packets type 1 contains a type 1 payload of LiInfo;
each of the plurality of TS packets type 2 contains a type 2 payload of LiCluster;
each type 2 payload of LiCluster contains a cluster number;
the plurality of TS packets type 2 include a plurality of data file TS packets and a plurality of LiFat TS packets;
the plurality of data file TS packets contain the plurality of data pieces;
the plurality of LiFat TS packets contain a LiFat file, wherein the LiFat file contains properties of the data file; and
the plurality of TS packets type 1 contain LiInfo including metadata of the LiFat file, wherein the metadata of the LiFat file includes information that indicate a range of cluster numbers associated with the plurality of LiFat TS packets.

2. The method of claim 1, wherein the LiFat file contains a location of the data file in the TS stream.

3. The method of claim 2, wherein the LiFat file further contains a file name, an extension, a checksum, and a size.

4. The method of claim 1, wherein the metadata of the LiFat file further includes information indicating a time the LiFat file was created, a size of the LiFat file, a LiFat file checksum, and a compression method.

5. The method of claim 1 further comprising:
creating a box comprising a plurality of payload blocks; and
placing the plurality of TS packets in the plurality of payload blocks,
wherein broadcasting the plurality of TS packets includes broadcasting the box via the satellite system.

6. The method of claim 1, wherein the data file is a binary file.

7. The method of claim 1, wherein:
creating the plurality of TS packets includes replacing a payload in an audio elementary stream with a data piece of the plurality of data pieces.

8. The method of claim 1, wherein:
creating the plurality of TS packets includes replacing a payload in a video packetized elementary stream with a data piece of the plurality of data pieces.

9. A system for data transmission, the system comprising:
an encoder for:
dividing a data file into a plurality of data pieces; and
placing the plurality of data pieces in a plurality of TS packets to create a TS stream; and
a broadcaster for broadcasting the plurality of TS packets via a satellite system wherein:
the plurality of TS packets comprise a plurality of TS packets type 1 and a plurality of TS packets type 2;
each of the plurality of TS packets type 1 contains a type 1 payload of LiInfo;
each of the plurality of TS packets type 2 contains a type 2 payload of LiCluster;
each type 2 payload of LiCluster contains a cluster number;
the plurality of TS packets type 2 include a plurality of LiFat TS packets and a plurality of data file TS packets;
the plurality of data file TS packets contain the plurality of data pieces;
the plurality of LiFat TS packets contain a LiFat file, wherein the LiFat file contains properties of the data file; and
the plurality of TS packets type 1 contain LiInfo including metadata of the LiFat file, wherein the metadata of the LiFat file includes information that indicate a range of cluster numbers associated with the plurality of LiFat TS packets.

10. The system of claim 9, wherein the LiFat file contains a location of the data file in the TS stream.

11. The system of claim 10, wherein the LiFat file further contains a file name, an extension, a checksum, and a size.

12. The system of claim 9, wherein the metadata of the LiFat file further include information indicating a time the LiFat file was created, a size of the LiFat file, a LiFat file checksum, and a compression method.

13. The system of claim 9, wherein:
the encoder is further for:
creating a box comprising a plurality of payload blocks; and
placing the plurality of TS packets in the plurality of payload blocks; and
the broadcaster broadcasting the plurality of TS packets includes broadcasting the box via the satellite system.

14. The system of claim 13, wherein the data file is a binary file.

15. The system of claim 9, wherein:
the encoder creating the plurality of TS packets includes replacing a payload in an audio elementary stream with a data piece of the plurality of data pieces.

16. The system of claim 9, wherein:
the encoder creating the plurality of TS packets includes replacing a payload in an video packetized elementary stream with a data piece of the plurality of data pieces.

17. A method for receiving transmitted data, the method comprising:
- receiving, via a satellite receiver, a TS stream comprising a plurality of TS packets;
- wherein:
  - the plurality of TS packets comprise a plurality of TS packets type 1 and a plurality of TS packets type 2;
  - each of the plurality of TS packets type 1 contains a type 1 payload of LiInfo;
  - each of the plurality of TS packets type 2 contains a type 2 payload of LiCluster;
  - each type 2 payload of LiCluster contains a cluster number;
  - the plurality of TS packets type 2 include a plurality of LiFat TS packets and a plurality of data file TS packets;
  - the plurality of data file TS packets contain the plurality of data pieces created by dividing a data file;
  - the plurality of LiFat TS packets contain a LiFat file, wherein the LiFat file contains properties of the data file; and
    - the plurality of TS packets type 1 contain LiInfo including metadata of the LiFat file, wherein the metadata of the LiFat file includes information that indicate a range of cluster numbers associated with the plurality of LiFat TS packets;
- identifying the plurality of TS packets type 1;
- reading the LiInfo in the plurality of TS packets type 1;
- based on the LiInfo, identifying the plurality of LiFat TS packets;
- reading the data of the LiFat file in the plurality of LiFat TS packets;
- based on the data of the LiFat file extracting the plurality of data pieces from the plurality of data file TS packets; and
- recreating the data file from the plurality of data pieces.

18. The method of claim 17, wherein the LiFat file contains a location of the data file in the TS stream.

19. The method of claim 18, wherein the LiFat file further contains a file name, an extension, a checksum, and a size.

20. The method of claim 17, wherein the metadata of the LiFat file further include information indicating a time the LiFat file was created, a size of the LiFat file, a LiFat file checksum, and a compression method.

* * * * *